(12) United States Patent
Martin et al.

(10) Patent No.: US 6,955,670 B2
(45) Date of Patent: Oct. 18, 2005

(54) NANOPUMP SYSTEM

(76) Inventors: Francis J. Martin, 160 San Fernando Way, San Francisco, CA (US) 94127; Robbie J. Walczak, 3265 Foxpoint Dr., Hilliard, OH (US) 43026

(*) Notice: Subject to any disclaimer, the term of this patent is extended or adjusted under 35 U.S.C. 154(b) by 238 days.

(21) Appl. No.: 10/170,774

(22) Filed: Jun. 13, 2002

(65) Prior Publication Data

US 2003/0013186 A1 Jan. 16, 2003

Related U.S. Application Data (60) Provisional application No. 60/298,733, filed on Jun. 15, 2001, and provisional application No. 60/298,450, filed on Jun. 15, 2001.

(51) Int. Cl.$^7$ ................................................. A61K 9/22
(52) U.S. Cl. ................................................. 604/891.1
(58) Field of Search .................. 604/890.1, 891.1, 604/65–67, 93.01, 131–133, 141–142, 151, 153, 241–242; 128/DIG. 1, 12, DIG. 13

(56) References Cited

U.S. PATENT DOCUMENTS 4,221,219 A * 9/1980 Tucker ........................ 604/141
4,639,244 A * 1/1987 Rizk et al. .................... 604/19
5,041,107 A * 8/1991 Heil, Jr. ...................... 604/891.1

* cited by examiner

Primary Examiner—Nicholas D. Lucchesi
Assistant Examiner—Michael M Thompson
(74) Attorney, Agent, or Firm—Peter Dehlinger; Courtney J. Miller (57) ABSTRACT

A self-contained delivery device for delivery a selected volume of stored electrolyte solution at selected time intervals is disclosed. The device includes a housing having a delivery port, a chamber containing an upstream supply reservoir for holding a quantity of electrolyte solution, a downstream delivery reservoir for receiving electrolyte solution from the supply reservoir and, disposed between the two reservoirs, a membrane having a plurality of flow-through channels extending between the two reservoirs. A pair of electrodes placed in the chamber on either side of the membrane and controlled by a controller contained within the housing for pumping selected quantities of the electrolyte solution at selected time intervals. The device includes a chamber, and a membrane disposed in said chamber and having a channel extending between an upstream chamber region, where the said channel has a selected minimum cross-sectional dimension in the range between 2 and 100 nm.

7 Claims, 12 Drawing Sheets

NANOPUMP SYSTEM

CROSS-REFERENCE TO RELATED APPLICATIONS

This patent application claims the benefit of U.S. Provisional Patent Application Ser. No. 60/298,733 entitled "Nanopump Delivery Device and Method" filed on Jun. 15, 2001; and U.S. Provisional Patent Application Ser. No. 60/298,450 entitled "Nanopump Device for Detecting DNA Sequences" filed on Jun. 15, 2001, the disclosures of which are incorporated as if fully rewritten herein.

FIELD OF THE INVENTION

The present invention relates to the field of (i) nanopump delivery devices and methods; and (ii) to the field of DNA sequence determination.

SUMMARY OF THE INVENTION

A. Nanopump Delivery Device and Method

The invention includes a self-contained delivery device for delivery a selected volume of stored electrolyte solution at selected time intervals. The device includes a housing having a delivery port, and contained within the housing, a chamber containing an upstream supply reservoir for holding a quantity of electrolyte solution, a downstream delivery reservoir for receiving electrolyte solution from the supply reservoir and, disposed between the two reservoirs, a nanopore channel membrane of the type described above.

Also included are a pair of electrodes placed in the chamber on either side of the membrane, a one-way valve connecting the delivery reservoir to the delivery port within the housing, allowing solution to flow out of the delivery port only, and a controller contained within said housing. The controller provides (i) a power source operatively connected to the electrodes for applying across the electrodes, a voltage potential effective to pump electrolyte solution from the supply to delivery reservoir, at a selecting pumping rate, and (ii) a timer for controlling the duration and timing of application of the voltage potential to the electrodes, to pump a selected volume of solution through said membrane, at selected time intervals.

The housing may be adapted for implantation at a body site, and the solution may contain a therapeutic drug for delivery at said site. The voltage applied to the electrodes may be, for example, in the 1–5 volt range, and the channels may have a minimum dimension in a selected range between about 2 and 30 nm. The timer is preferably designed to apply across the electrodes, a pulsed voltage whose duration is effective to pump a selected volume of supply solution across said membrane.

B. Nanopump Device for Detecting DNA Sequences

The invention also includes a device for detecting a target nucleic acid sequence contained in a solution of solution of nucleic acid fragments and having a selected pH. The device includes a chamber, and a membrane disposed in said chamber and having a channel extending between an upstream chamber region adapted to hold the electrolyte solution of such different-length fragments, and a downstream chamber region adapted to hold an electrolyte solution, where said channel has a selected minimum cross-sectional dimension in the range between 2 and 100 nm and a net surface charge within a given pH range that includes the selected solution pH. Attached to a wall portion of the channel, is a capture nucleic acid having a sequence complementary to the target sequence. Upstream and downstream electrodes disposed in the upstream and downstream chamber regions, respectively, are in contact with electrolyte solution placed in the corresponding chamber regions.

A controller in the device includes a power source operatively connected to the electrodes for applying a selected voltage potential across the channel, to move individual nucleic acid sequences contained in the solution through the channel, where the sequences can hybridize to complementary target sequences bound to the channel wall portion.

The controller may further include a voltage regulator for regulating the voltage applied across said channel, to effect selective release of the target sequence from the capture nucleic acid, based on the degree of complementarity between the target sequences and the capture nucleic acid.

The membrane may include an array of channels, each having attached to a wall portion thereof, a capture nucleic acid with a selected sequence complementary to a selected one of a plurality of different sequences. In this embodiment, one of the electrodes may include a plurality of electrode elements, each associated with one of said membrane channels, and the controller may be operatively connected to each of the electrode elements to apply and regulate the voltage applied across each of the channels. The controller may be effective to place across the electrodes, a voltage potential effective to move nucleic acid fragments electrophoretically through said channel. The channel(s) in the membrane preferably have a minimum dimension in the 2–25 nm range.

Also disclosed is a method for detecting a target nucleic acid sequence contained in an electrolyte solution of nucleic acid fragments and having a selected pH. The method includes placing the solution in a chamber having a membrane disposed therein, the membrane having a channel extending between an upstream chamber region adapted to hold the electrolyte solution of such different-length fragments, and a downstream chamber region adapted to hold an electrolyte solution, where the channel (i) has a selected minimum cross-sectional dimension in the range between 2 and 100 nm, (ii) a net surface charge within a given pH range that includes the selected solution pH, and (iii), attached to a wall portion of the channel, a capture nucleic acid having a sequence complementary to the target sequence. There is applied a voltage potential sufficient to move nucleic acid sequences in the solution through the channel, where the sequences can hybridize to complementary target sequences bound to the channel wall portion. Captured target sequences are released from the channel by applying a voltage potential across the channel effective to dissociate hybridized nucleic acids, and released target sequences are detected.

The releasing step may include applying a voltage across the channel effective to selectively release target sequences from the capture nucleic acid, based on the degree of complementarity between the target sequence and the capture nucleic acid.

The membrane may include an array of channels, each having attached to a wall portion thereof, a capture nucleic acid with a selected sequence complementary to a selected one of a plurality of different sequences. In this embodiment, one of the electrodes includes a plurality of electrode elements, each associated with one of the membrane channels. The controller in this embodiment is operatively connected to each of the electrode elements to apply and regulate the voltage applied across each of the channels. The releasing step may include applying a voltage across each of said channels, individually, a voltage potential effective to selectively release target sequences from the capture nucleic acid, based on the degree of complementarity between the target sequence and the capture nucleic acid.

These and other objects and features of the invention will be more fully appreciated when the following detailed description of the invention is read in conjunction with the accompanying drawings.

DETAILED DESCRIPTION OF THE INVENTION

The present invention, called a "nanopump", is a fluid pump comprising a collection of parallel arrays of multiple channels which, in their smallest dimensions are in the approximate range of 5 nm–100 nm. The channels, e.g., rectangular or U-shaped channels, are fabricated from materials such as silicon and silicon oxides, polymers, or metals, such as titanium, the surfaces of which exhibit a net surface charge when exposed to electrolyte solutions at appropriate pH levels. Under the influence of an electrical field applied across the array, electroosmotic flow is induced, pumping aqueous subject matter from one side of the array to the other.

By controlling the geometry of the multiple-channel arrays, the individual channel width, surface charge density and polarity, together with controlling the array thickness and electrolyte properties, the flow properties can be tailored for highly specific applications.

A. Theory of Operation

The nanopump is based on electroosmotic flow. Electroosmotic flow is a basic physical-chemical phenomenon, but has special properties when it is applied to materials such as silicon or silicon oxides. A further examination of silicon (Si) surface chemistry is required to ensure that the basic process is well described.

The chemical state of the silicon surface can be either in an oxidized form or oxide-free, bare silicon, terminated by Si—H groups. The silicon surface, after a wet cleaning step and a final oxidative step, is hydrophilic. The thickness of this $SiO_2$ layer is between 0.6 and 2.0 nm, its nominal value depending on oxidation conditions and the measurement techniques used. This chemical oxide, often referred to as "native" oxide, forms a passivation layer with a dangling-bond defect density in the range of $10^2$ $cm^{-2}$ at the $Si/SiO_2$ interface. The defect densities reported are about two orders of magnitude higher than for thermal oxides. Recent studies suggest that the quality of the native oxides is strongly dependent on the applied chemistry in which they are formed, and that higher-quality oxides can be obtained with alternate chemistries such as DI water/ozone.

Wet-chemically grown oxides are hydrophilic in contrast to thermal oxides. This difference is caused by the way the oxygen atom is bound to the silicon on the surface. Thermal oxides are characterized through the formation of siloxane rings, which are very stable against hydrolysis. Wet-chemically grown oxides are generally covered with surface hydroxyl groups (Si—OH) called silanol groups, and are very similar in their behavior with respect to silica gels. Geometrical considerations and chemical measurements indicate an average surface density of around five hydroxyl groups per $nm^2$, but this number can typically range from 2–12 hydroxyl groups per $nm^2$. It is important to note that not all hydroxyl groups formed on a surface are chemically equivalent owing to structural differences in their coordination, but in general the surface hydroxyl groups on a hydrous oxide have donor properties similar to those of their corresponding counterparts in solution, the hydroxides.

Figure 1:
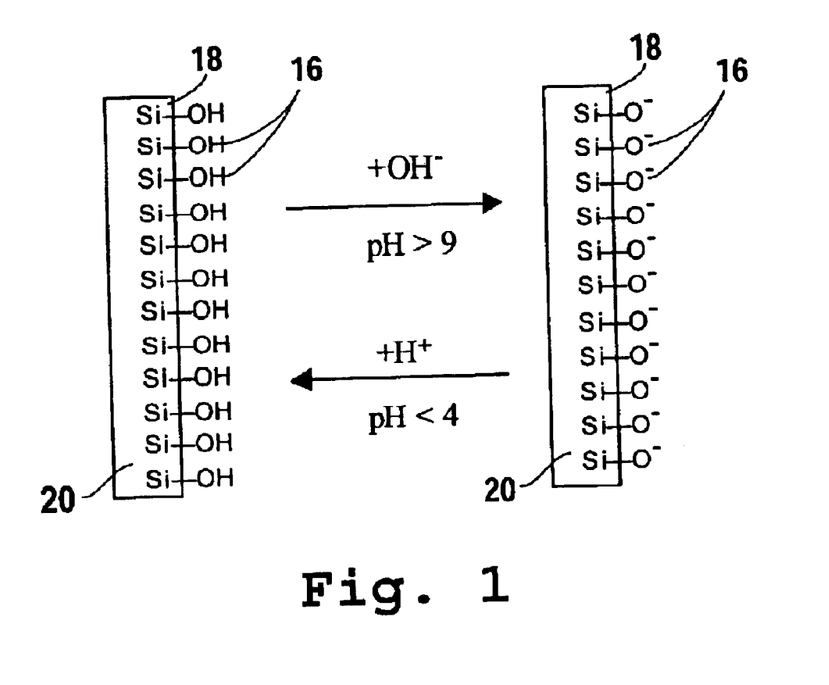
FIG. 1 illustrates the pH dependence of charge on a silicon surface.

FIG. 1 illustrates the dissociation of silanol(-) groups, such as groups 16, at the surface 18 of a silicon substrate 20, at low and high pH extremes. The adsorption of metal ions and protons can be understood as competitive complex formation with deprotonated surface groups (Si—O—) which behave like Lewis bases. This means that the adsorption of species on a hydrous oxide surface of Si can be compared with complex formation reactions in solution. However, the extent of adsorption also depends strongly on the surface charge of the oxide i.e., the number of hydroxyl groups and the degree of dissociation and on the pH of the solution. Silanol groups are completely ionized at pH levels above 9 (right in FIG. 1), creating a negative surface potential. Below pH 4 (left in FIG. 1) the silanol groups are protonated and the surface 20 is virtually neutral. Between these two pH extremes, the surface becomes progressively more deprotonated, and negatively charged, with increasing pH.

Figure 2:
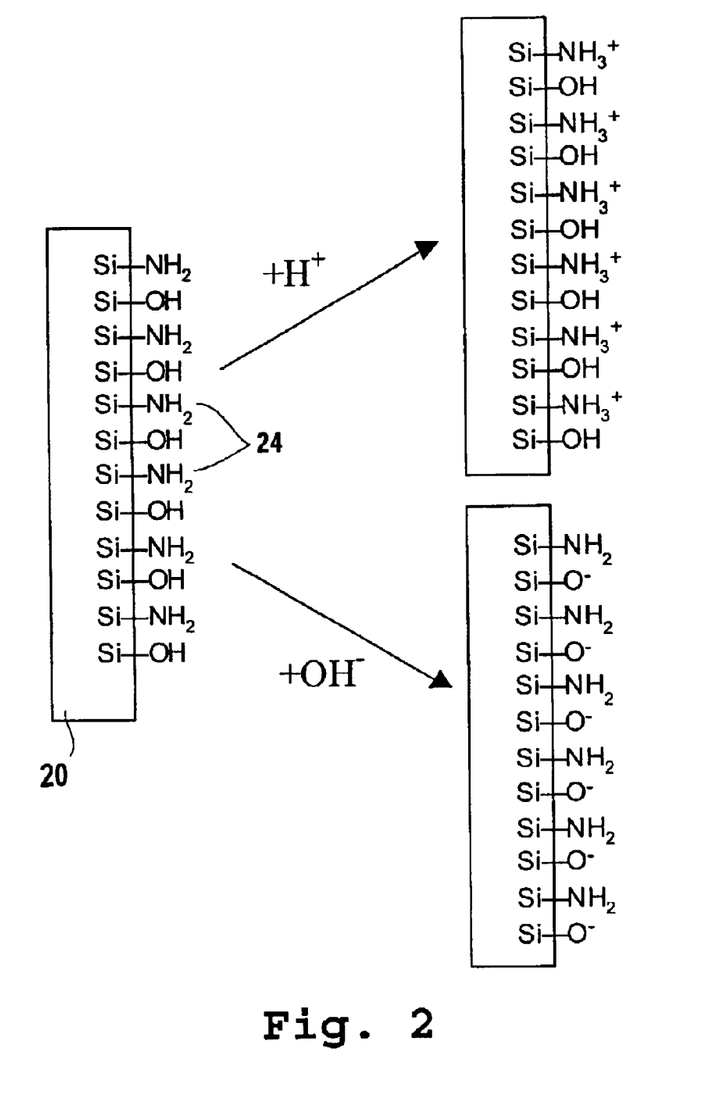
FIG. 2 illustrates the pH dependence of charge on a silicon surface derivatized with amine groups.

FIG. 2 shows a silicon substrate having a portion of its silyl groups are modified to amino groups, such as groups 24. Methods for derivatizing a glass or silicon surface with amino groups are well known. A hydrolytically stable amino-silica glass coating material can be applied on the inner surfaces of nanopump channels in order to create a surface which, depending on the pH of the medium, can be either positively or negatively charged. Aminopropyltriethoxysilane, or a similar silane reagent, is used to introduce primary amino groups onto the silica surfaces.

Following such treatment, as illustrated in FIG. 2, the net charge at the surface of the coating material depends on the degree of protonation of the amino groups and the degree of ionization of the silanol groups, thus enabling manipulation of the magnitude and direction of the electroosmotic flow (EOF). At lower pH (at levels somewhat below pH factor 6.0), the coating bears a net positive charge, which results in an electroosmotic flow from the cathode toward the anode and minimizes the wall-solute interactions of basic species. At higher pH (at levels somewhat above pH factor 6.5), the coating surface bears a net negative charge and the coated nanopore behaves like an uncoated one, having an EOF in the cathodic direction. Such an amino-silica glass coating is extremely stable under both acidic and basic conditions.

Electroosmotic flow is also influenced by addition of certain organic bases to a running buffer. For example, addition of N,N,N',N'-tetramethyl-1,3-butanediamine (TMBD) in the running electrolyte effects electroosmotic flow and the migration behavior of basic proteins in bare fused-silica capillaries. Depending on the electrolyte pH (4.0, 5.5 and 6.5, respectively) and additive concentration the electroosmotic flow can be either cathodic or anodic. A similar Langmuirian-type dependence of the electroosmotic flow on the concentration of TMBD in the running electrolyte was found at the three experimented pH values, which may be indicative of the specific adsorption of the additive in the immobilized region of the electric double layer at the interface between the capillary wall and the electrolyte solution.

B. Electroosmotic Flow

Most surfaces, including silicon as noted above, obtain a surface electric charge when they are brought into contact with electrolyte solutions. This surface charge influences the ion distribution in the polar medium forming the electric double layer. Gouy and Chapman modeled the region near the surface as a diffuse electrical double layer (EDL), where they equated the non-uniform ion distribution to the competing electrical and thermal diffusion forces. Stern later presented the basis for the current model, in which the Stern plane splits the EDL into an inner, compact layer and an outer, diffuse layer.

In the inner layer, also known as the Stern layer, the geometry of the ions and molecules strongly influences the charge and potential distribution, with the Stern plane located near the surface at roughly the radius of a hydrated ion. The inner layer between the surface and the Stern plane is considered to be immobile. When the ions are within the Stern plane, thermal diffusion will not be strong enough to overcome electrostatic, or Van der Waals forces and they will attach to the surface to become specifically adsorbed.

In the outer diffuse layer, the ions are far enough away from the surface that they are mobile. Electrokinetic transport phenomena such as electroosmosis can be understood in terms of the surface potential at the surface of the shear (approximately at the Stern plane), known as the zeta potential ($\xi$), because these phenomena are only directly related to the mobile part of the EDL.

Because of the EDL, the net charge density ($\sigma_e$) within the diffuse layer is not zero. If an electric field is applied along the length of the channel, a body force is exerted on the ions in the diffuse layer of the EDL. The ions will move under the influence of the applied electrical field, pulling the liquid with them and resulting in electroosmotic flow. The fluid movement is carried through to the rest of the fluid in the channel by viscous forces. This electrokinetic process is called electroosmosis.

Figure 3:
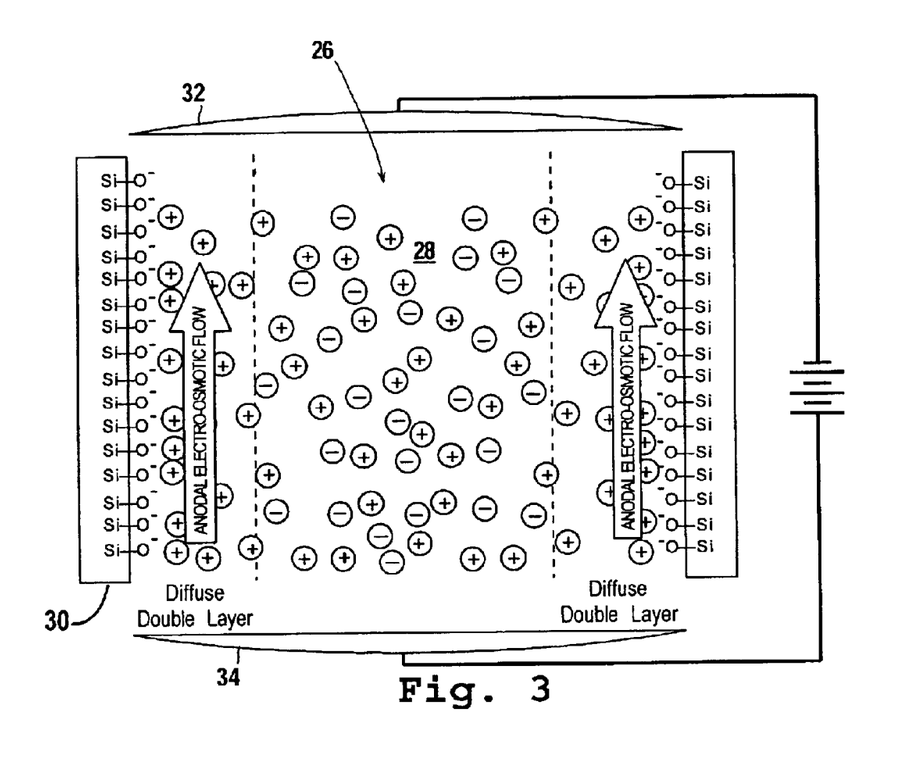
FIG. 3 illustrates the principle of electro-osmotic flow in a channel having charged surface groups.

FIG. 3 represents a nodal electroosmotic flow induced through a channel 26 filled with an electrolyte solution 28. The channel is lined with negatively charged ionized silanol groups, such as groups 30. Potential difference is established by placing electrodes 32, 34 at opposite ends of channel. Since fluid motion is initiated by the electrical body force acting on the ions in the diffuse layer of the EDL, electroosmotic flow depends not only one the applied electrical field but also the net local charge density in the liquid.

Prior studies of EDL and electroosmotic flows are limited to systems with simple geometries such as cylindrical capillaries with circular cross sections and slit-type channels formed by two parallel plates. However, for the channels embodied in the present invention, and in other fluidic devices produced by micro-machining techniques, the cross-sectional shape is close to planar. In such a situation, the EDL field is two-dimensional and will influence the two-dimensional flow field in the rectangular microchannel.

B. Pump Structure

Figure 4:
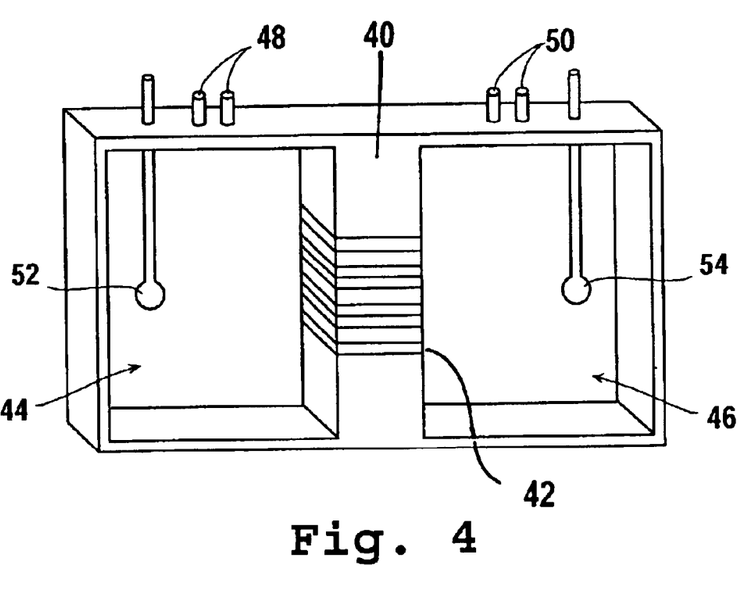
FIG. 4 shows, in simplified view, a nanopump constructed in accordance with the invention.

FIG. 4 is a pictorial representation of a nanopump 38 constructed according to the present invention. The pump includes a nanopore filter or membrane 40 providing a plurality of rectangular-shaped (substantially planar) parallel nanochannels, such as microchannels 42, each channel connecting a donor or supply reservoir 44 to receiver or recipient reservoir 46. The nanopump is fabricated from silicon-based materials using the techniques described herein. A plurality of ports 48 feed donor reservoir 44 and a second plurality of ports 50 draw excess from the receiver reservoir 46. A pair of electrodes 52, 54 are used to apply a potential difference across the membrane are suitably connected to a power source.

Figure 5:
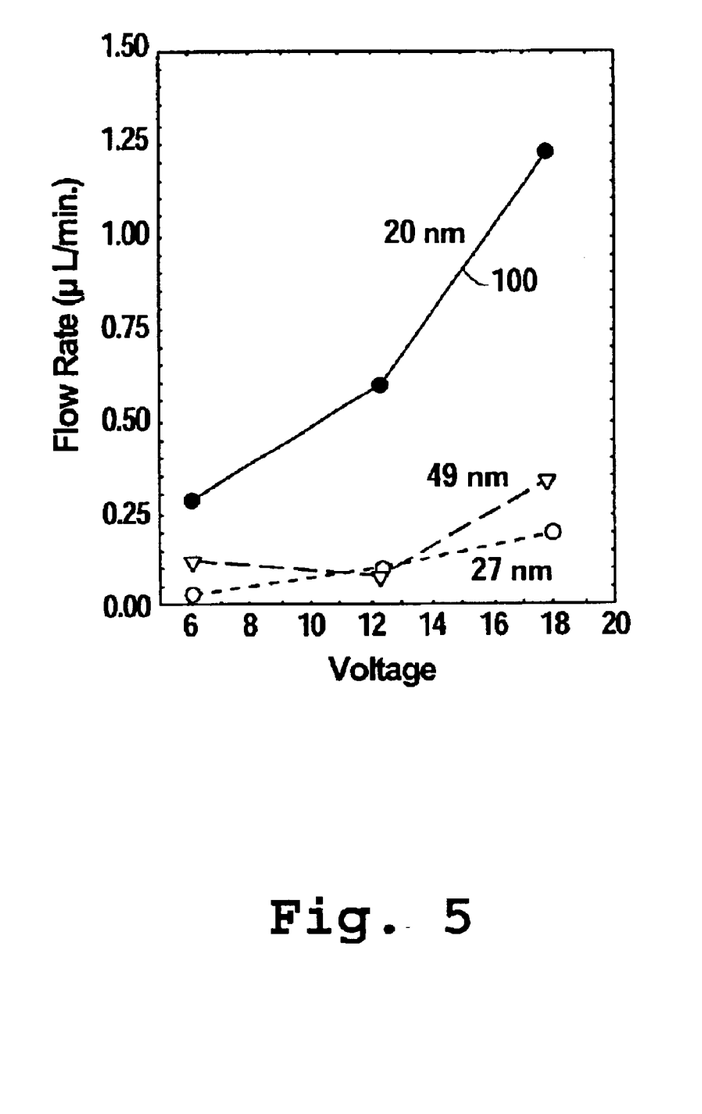
FIG. 5 shows plots of flow rates in the nanopump of the invention as a function of applied voltage, for various pore sizes.

FIG. 5 is a graph that depicts the relationship between electrolyte flow rate and voltage applied to nanopumps with different channel widths. In the preferred embodiment, a nanopore membrane is placed between two chambers. This structure promotes electroosmotic flow when a potential difference is applied across the membrane. The resultant flow rate is related to the porosity of the membranes and to the size of the channel. Unexpectedly, optimal flow rates are observed at a channel dimension of about 20 nm. Greater channel dimensions, e.g., 27 and 49 nm, exhibit lower flow rates. The data in FIG. 5 were obtained using channels with poly-silicon and crystalline silicon material sidewalls with a pore geometry that is about 45 $\mu$m in length, about 20 to 40 nm in width, and about 5 $\mu$m in depth.

Figure 6A:
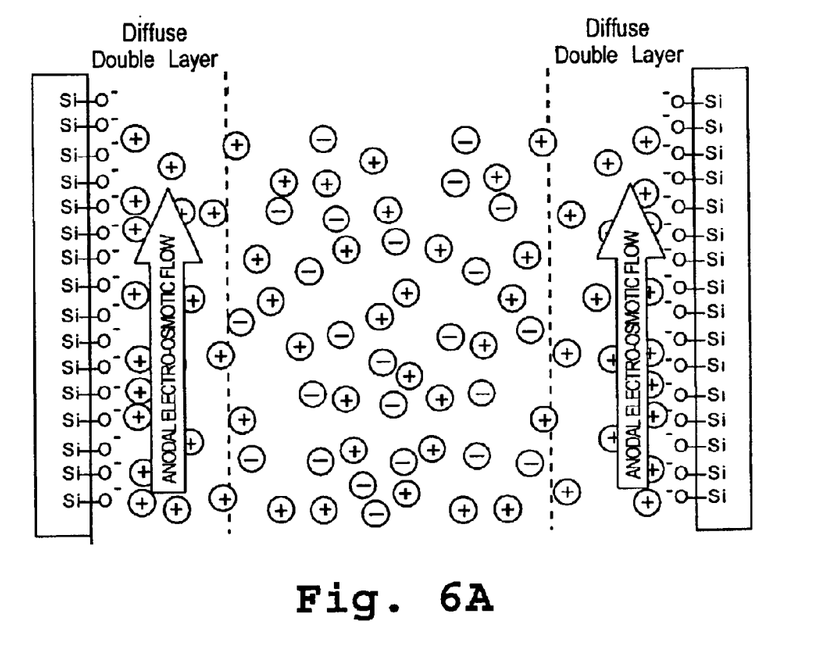
FIG. 6 illustrates electroosmotic flow principles in a nanopore pump.
Figure 6B:
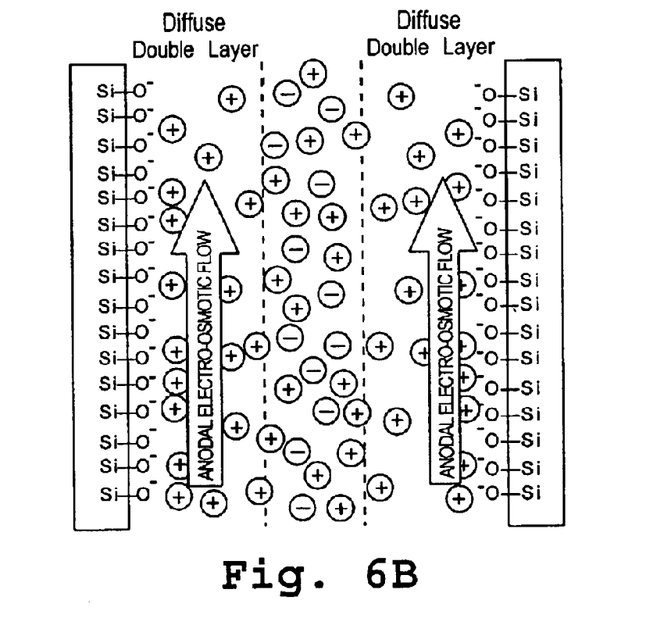

FIG. 6 illustrates the relationship between channel width and flow rate. This phenomenon may be partially related to the increased proportion of the overall channel volume occupied by the diffuse ionic double layer as the channel width is decreased. Flow rate is also influenced by electrolyte properties including pH, ionic strength and ionic species.

In operation, the reservoirs in the pump are filled with an electrolyte solution whose pH is effective to impart a net charge, e.g., net negative charge, to the walls of the nanopore membrane. The power source is then activated to apply a selected voltage potential across the electrodes, producing electro-osmotic pumping across the membrane from the supply to the recipient reservoir.

C. Fabrication Process

The nanopump is created through a microfabrication process using bulk and surface micromachining. In the preferred embodiment, the microfabricated nanopump comprises a surface-micromachined array of channels on top of an anisotropically etched silicon wafer that provides mechanical support. The selection of channel pore size (the minimum channel dimension) is in 5–100 nm range, e.g., 5, 10, 20, 30, 50 or 80 nm, preferably 10–30 nm pore size.

To reach a desired pore size in the tens of nanometers range, strategies have been developed based on the use of a sacrificial oxide layer sandwiched between two structural layers. This process is discussed in the co-pending patent application incorporated herein by reference. Because the flow rate of a nanopump varies according to the material being pumped, it is important to tailor new nanopumps for specific applications as discussed above.

A nano-channel is formed by sandwiching a $SiO_2$ sacrificial layer, the thickness of which determines the nominal pore size, between a polysilicon structural layer and the silicon wafer. For this design, increasing the number of entry holes maximizes the flux. Phosphate buffered saline (PBS) fluxes as high as 1.0 mL/cm2-hr have been attained for membrane filters with 30 nm-sized pores. Filtration tests showed greater than 99% of 100 manometer beads (actual log reduction of greater than 5) were retained with 50 nanometer pores.

FIGS. 7A–7D are pictorial representations of the cross-section of a wafer after successive stages in the microfabrication process used to create nano-channel arrays. The nano-channel arrays are microfabricated from silicon and silicon nitride (Six,Ny) architectures. The critical dimension (i.e., width) of the nanopump channels will be defined by the thickness of sacrificial silicon oxide films 60, a parameter that can be controlled to sub-nanometer resolution. The fabrication process allows for dense arrays of nano-channels, thus improving the utility of these arrays for pumping applications. The fabrication process is summarized here for review. A detailed and specific discussion of this fabrication process is presented, for example, in U.S. Pat. Nos. 6,044,981, 5,985,328, 5,985,164, 5,948,255, 5,928,923, 5,798,042, 5,770,076, and 5,651,900, all of which are incorporated herein by reference.

Figure 7A:
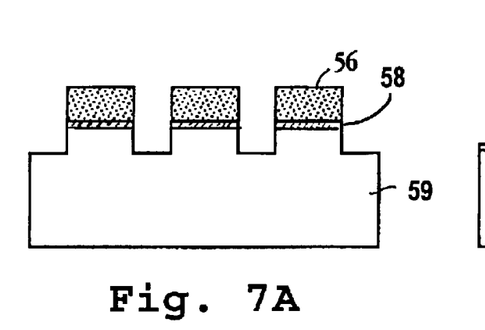
FIGS. 7A–7D illustrate steps in the production of a nanopore filter used in the nanopump of the invention.
Figure 7B:
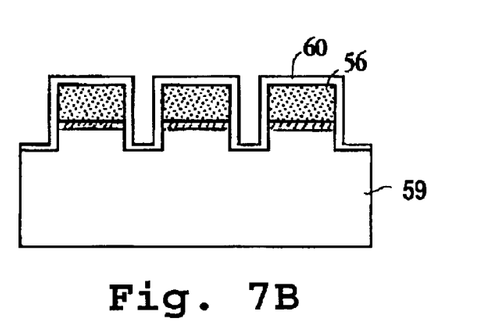
Figure 7C:
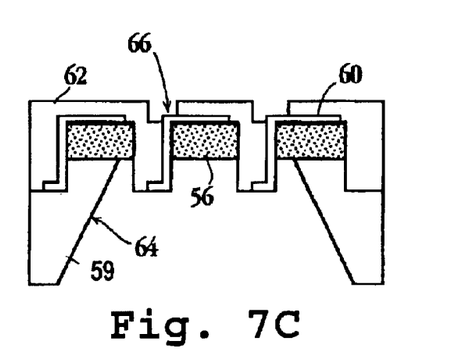

As a first step, and with reference to FIG. 7A, a structural polysilicon layer 56 is deposited over a silicon nitride layer 58 (an etch-stop layer) and etched with the nanopore mask. Following this, a sacrificial oxide layer 60 (FIG. 7B) is grown using thermal oxidation to define the nanopump array thickness. Thermal oxidation gives thickness control to sub-nm resolution across in entire 4" silicon wafer.

A second polysilicon structural layer 62 is then deposited over the pores and planarized to allow access to the nanopump channels from the front face of the array. A silicon nitride protective layer is then deposited and etch holes, such as hole 64 are opened on the backside of the wafer. The bulk silicon is removed through these etch holes up to the etch stop layer of the array, giving the structure shown in FIG. 7C.

Figure 7D:
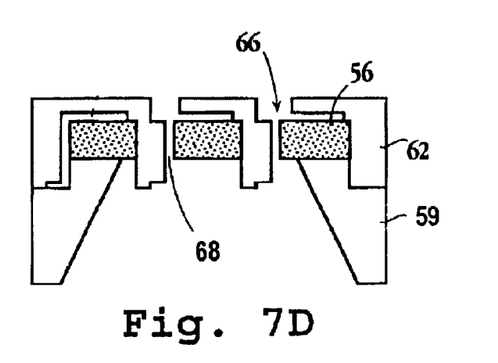

The structure is then released by etching the protective nitride layers and the sacrificial oxide layers in a concentrated HF bath. In particular, sacrificial layer 60 is etched in the region between entry holes and the lower opening 64, producing defined-size nanopore channels 68 (FIG. 7D). Surface modification of the polysilicon structure reverts it to a hydrophilic surface, thus making it useful as a filter for bio-fluids.

D. Molecular Filtration and Separation

Many clinical and research applications involve separation of specific biological molecules, such as nucleic acids and proteins, for further analysis and characterization.

Figure 8A:
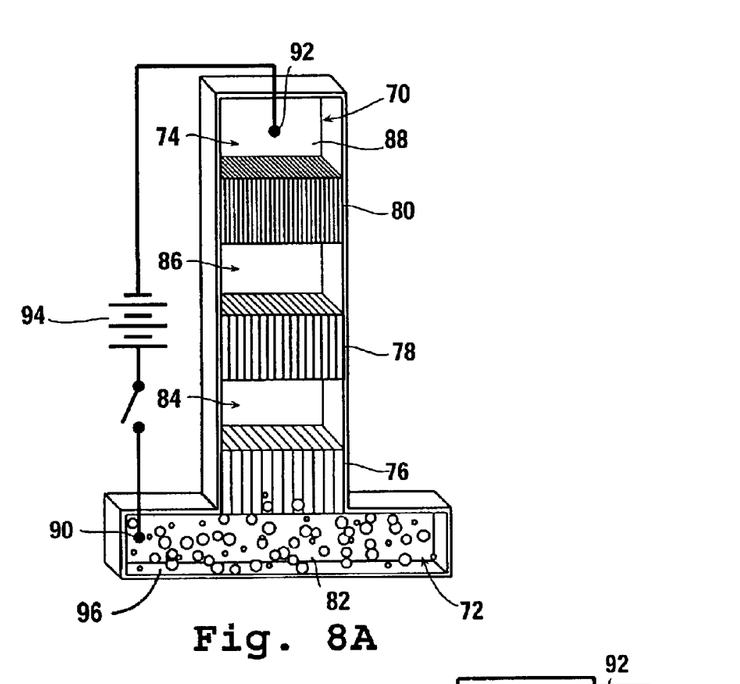
FIGS. 8A and 8B illustrate the operation of a nanopump filtration device constructed in accordance with the invention.
Figure 8B:
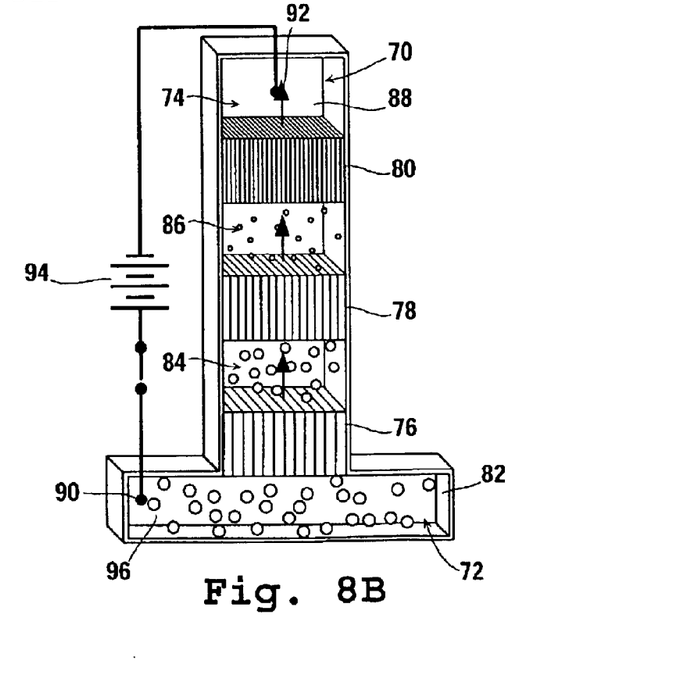

FIGS. 8A and 8B show the basic elements of a nanopump based separator device 70 constructed in accordance with the invention. The device generally includes a separation chamber 70 having upstream and downstream ends 72, 74, respectively, and a plurality of membranes 76, 78, 80 that partition the chamber into a plurality of separation regions 82, 84, 86, and 88, including an upstream chamber region 82 and a downstream chamber region 88. Each membrane, such as membrane 76, is a nanopore filter of the type described above, and has a selected channel size for filtering macromolecules, e.g., proteins or nucleic acid fragments, of selected sizes.

The device also includes electrodes 90, 92 disposed in the upstream and downstream chamber regions, respectively, and a power source 94 connecting the two electrodes. Each chamber region may further include a side inlet and outlet (not shown) for removing liquid contained in each chamber region.

In operation, a mixture of macromolecules or other solute species and, optionally, small particles, such as virus particles or colloids or liposomes, in an electrolyte are placed in the downstream chamber regions, and the other chamber regions are filled with a suitable electrolyte solution, in particular, one whose pH supports a net charge on the membrane wall surfaces. By applying a selected voltage across the electrodes, liquid in the each chamber is pumped in a downstream direction across the immediately downstream membrane. At each membrane, macromolecules that are larger than the membrane pore size will be retained in the upstream channel region, and those that are smaller will pass through into the downstream channel region.

FIG. 8A shows the device with a sample 96 of different-sized macromolecules in an electrolyte solution placed in upstream channel region 82, and a suitable electrolyte solution placed in each of the upstream channel regions. When a voltage of appropriate polarity and field strength is applied across electrodes 90, 92, sample 96 is drawn first through membrane 76, which discriminates between the largest macromolecules (or particles) in the sample and all other sample species. Similarly, as solution in the next upstream channel region 84 migrates is pumped through membrane 78, this membrane blocks passage of macromolecules of a certain size, and passes others, producing a successively greater concentration of smaller-sized macromolecules at each upstream channel region. At the end of the filtration process, the macromolecules contained in each channel region, including the upstream-most region, can be removed, e.g., by flowing a lateral stream of electrolyte through each channel region.

The system of stacked nanopumps described above may be modified for performing the specific isolation and purification of a particular protein or oligonucleotide from a complex mixture or crude cell extract rapidly and precisely using electroosomotic flow. For specific protein separation, the surfaces of the silicon nanopump channels can be chemically modified to contain covalently linked ligands with strong and specific affinity to their conjugate. The chemistry of silanization is well established and can be easily modified for specific ligand attachment for use to capture a variety of enzyme families.

For specific oligonucleotide isolation and purification, separate nucleic acid oligonucleotides complementary to the nucleic acid sequence intended for capture can be synthesized relatively inexpensively using traditional synthesis methods. These capture oligonucleotides could then be covalently linked to the surfaces of the nanopump channels using established methodology and can be used to capture any specific oligonucleotide of interest.

Most importantly, this device allows for the simple and rapid purification of multiple specific biomolecules at the same time. Each nanopump level can be 'programmed' to collect a specific molecule in a complex mixture by simply by inserting the correct nanopump 'module' primed with the appropriate protein capture ligand or nucleic acid oligonucleotide. In simple terms, this device is capable of performing numerous molecular isolations from one sample with one simple electroosmotic run that is both user-customizable and scalable.

In summary, the proposed device has several advantages over current laboratory methods for rapid and precise separation, purification and isolation. With the use of nanopump array modules, exact size-exclusion fractionation can be performed on multiple complex samples in less time and with precise resolution. Also, specific purification and isolation for a variety of molecules can be recovery efficiency. Finally, this device can perform the separation, filtration, and affinity purification of biomolecules by simply switching user-customizable modules, eliminating the need for multiple expensive electrophoretic and liquid chromatographic equipment.

E. Implantable Drug-delivery Device

Figure 9A:
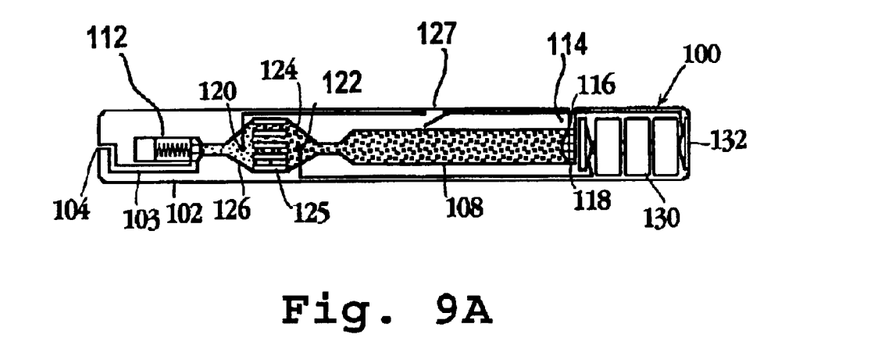
FIGS. 9A and 9B illustrate the operation of a nanopump drug-delivery device constructed in accordance with the invention.
Figure 9B:
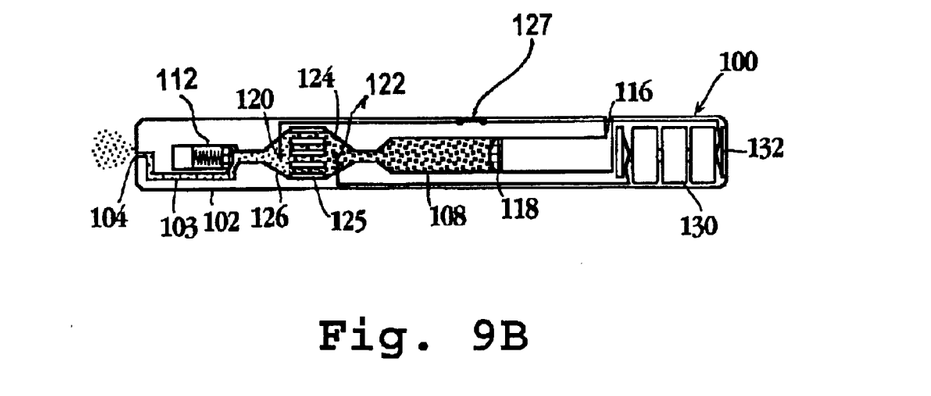

FIGS. 9A and 9B illustrate an implantable drug delivery device 100 constructed according to the present invention, and shown at initial and half-spent stages of operation, respectively. The device generally includes a housing 102 having a delivery port 104. The housing is formed of a suitable biocompatable material that allows its placement at an implantation site in a body.

Contained in the housing is a supply reservoir 108, a nanopump 110, constructed in accordance with the invention, and a one-way check valve 112 that allows one-way flow of solution contained in reservoir 108 from the pump to the exit port, via a channel 103. The reservoir, pump and valve are all part of a continuous flow system, as shown. Also shown is a vent structure 114 that includes a vent 116 and a plunger 118 disposed within reservoir 108. As solution is pumped out of the reservoir through exit port 104, the reservoir space is progressively filled by movement of plunger 118 toward the pump, as indicated in FIG. 9B, with the reservoir volume upstream of the plunger being filled progressively by fluid available at the implantation site.

The nanopump is activated by means of a pair of electrodes 120, 122 disposed on either side of a nanopore membrane 125 in the pump, and constructed in accordance with the invention. More particularly, electrode 122 is contained within an upstream supply reservoir 124 in the pump, and electrode 120, within a downstream recipient reservoir 126 in the pump. Application of a voltage potential across the two electrodes is effective to pump electrolyte drug solution in a downstream direction, in accordance with the invention.

The power source in the device, for applying a potential across the pump electrodes, is a battery pack indicated at 130. The battery pack has a voltage of preferably 1–5 volts. Activation of voltage from the battery pack to the electrodes is through a timing control unit 132 which is a small processor designed to produce an activation signal for a selected signal duration, e.g., 1–5 seconds, at selected time intervals, e.g., every 4 or 8 hours.

In operation, the device, including the supply reservoir and the nanopump, is filled with an electrolyte solution, typically a drug solution having a selected drug concentration. Before implantation, the control unit is adjusted to produce desired metered amounts of drug solution, e.g., p1 to n1 amounts, at selected time intervals, e.g., every eight hours. The loaded, programmed device is then implanted at an internal body site, e.g., at a subcutaneous site, to deliver a metered amount of drug solution at selected time intervals.

Power requirements to induce electroosmotic flow are to be low due to the relatively porosity provided by the multiple parallel channel arrays. Moreover, the same geometry favors fluid flow. Exquisite on-off control, and thus control of drug input rate and pattern, is provided by the selected switching circuitry. For example, pulse, square wave and continuous patterns are achievable simply by controlling the length of time the switch 127 is closed. As described, having a miniaturized timer in the circuitry provides a means of providing "on-board" intelligence. Alternatively, the switch may be closed magnetically. Thus external control is possible by simply placing a magnet close to the skin surface, providing a drug input rate and pattern controlled by the patient himself, or his caregiver.

F. Sizing Nucleic Acid Fragments

The nanopump described herein can be adapted, in accordance with another aspect of the invention, to perform oligonucleotide length analysis using a rapid, one-step process that potentially limits complex sample preparation. For this application, a silicon micromachined membrane that contains an array of nano-sized pores with dimensions of approximately 2 nm is fabricated. An electrical potential across the pore is used to assist in moving oligonucleotides from the sample through the pores. The pore geometry is selected to allow single oligonucleotides to proceed through the pore in a linear fashion (i.e. end-to-end).

A separate sensing array allows for monitoring the pore blockage by nucleic acid molecules as a function of time. For example, examining the change in electrical potential across the pore as the oligonucleotide moves through it can provide a measure of fragment length (i.e. number of base pairs). It is common in the study of neurobiology and biophysics to form biological membranes or planar lipid membranes (such as lipid bilayer films) and to introduce nano-sized channels. These channels can be made to stay open for extended periods of time. Kasianowicz et. Al, Proc Nat Acad Sci (USA), 93(24):13770 (1996) reasoned that applying a transmembrane voltage could cause polyanionic oligonucleotides to flow through a membrane channel as an extended linear chain. When these molecules were present in the channels, they could be detected as a reduced or blocked level of normal ionic flow measured as reduced ionic current. Measurement of the time and magnitude of such blockages was demonstrated as a method of recording the molecular length, and other characters, of the particular molecule.

In the case of the nanopump envisioned here, the biological membrane is replaced with a membrane containing nanopores that are fabricated using silicon micromachining, as described above, but where two "planar" channels placed end to end and at right angles with respect to each other, to form a one-dimensional (1D), pore (i.e. channel) shaped like a rectangular parallelepiped. The pore geometry can be designed with precise and selectable nano-sized channel widths in the 2–50 nm size range. The pore height and pore length can also be designed with microsized dimensions in the 1–50 nm size range.

Figure 10A:
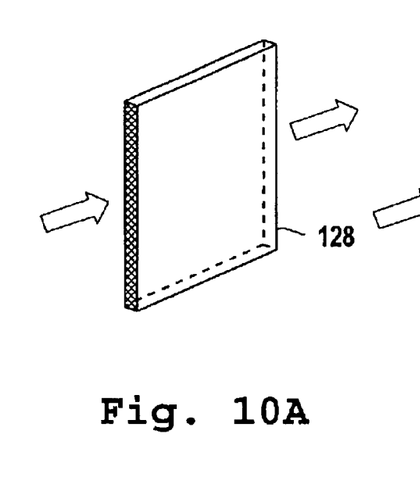
FIGS. 10A and 10B illustrate the construction of a nanopore opening formed by two nanopore planar channels.

A diagram of a typical 2D nanopore channel 128 is shown in FIG. 10A. A selected number of pores, with the typical shape shown in, are normally fabricated into a planar, membrane-like structure, as described above.

Figure 10B:
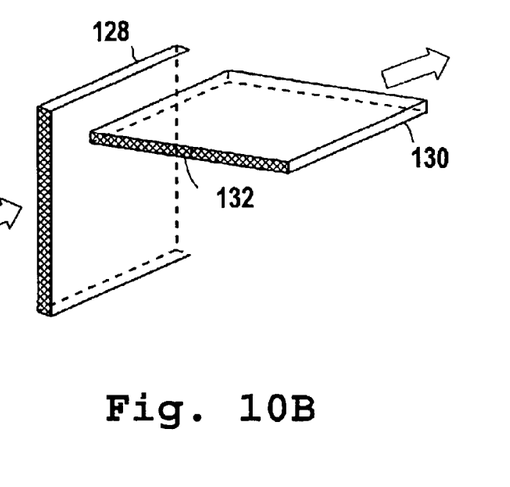

In order to determine strand length the DNA strand must traverse a man-made nano-sized pore described above in a linear fashion. This is accomplished, in accordance with one embodiment of the invention, by using a second 2D pore 130 located adjacent and perpendicular to the first 2D pore as seen in FIG. 10B. Using this design, the intersection 132 between the microfabricated pores can have nano-size dimensions in both planes and a nano-sized pore-length so it more closely approximates a 1D (that is, linear as opposed to planar) biological pore.

Figure 12:
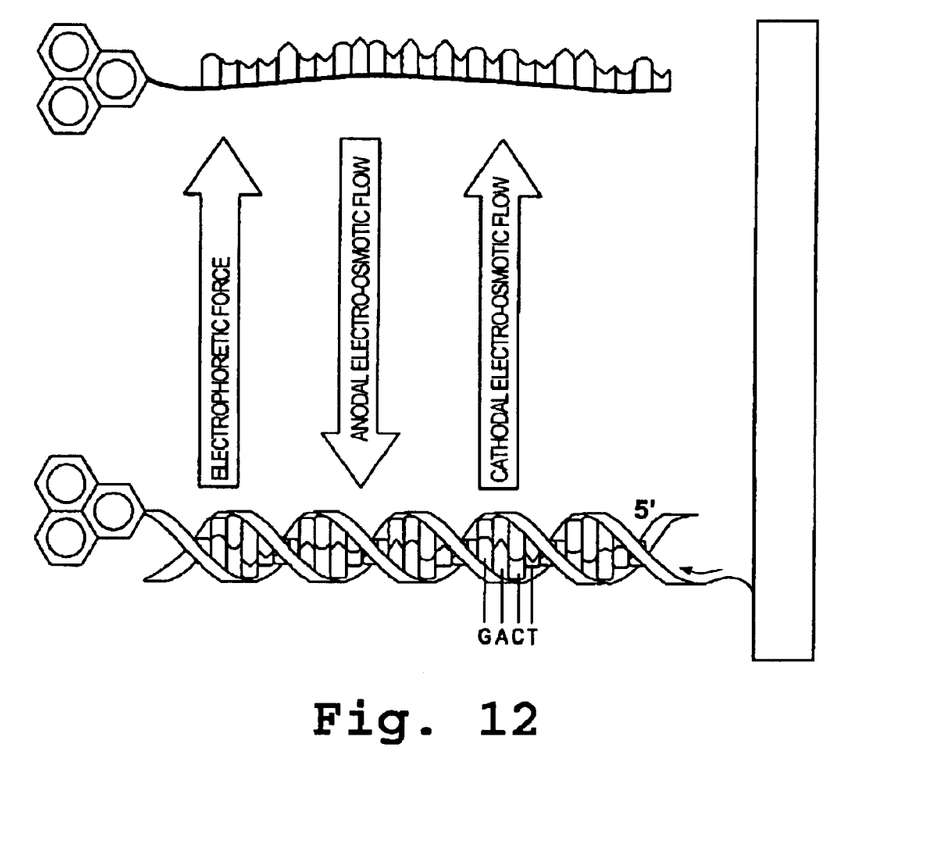
FIG. 12 illustrates electrokinetic forces acting on a DNA molecules bound to a wall surface in the SNP-sequence detecting device.

Native DNA consists of one long molecule that makes up a chromosome. It is a two-stranded spiral (double-helix) that includes about 3 billion nucleotides arranged in subunits called base pairs. A segment of DNA carrying genetic instructions, or gene, is approximately 100,000 base pairs long. To perform many DNA analytical experimentation (e.g. sequencing, Southern hybridization) the long DNA molecule is usually digested into smaller, single-stranded fragments that typically contain <500 base pairs (FIG. 12). The diameter, D, of a single-stranded, 100 base pair oligonucleotide is approximately 2 nm and the length, L, is approximately 200 nm. In the present invention, by measuring the exact time necessary for the passage of one molecule through the channel, it is possible to correlating this time with the length of the molecule. In this manner, exact oligonucleotide length can be established.

Figure 10C:
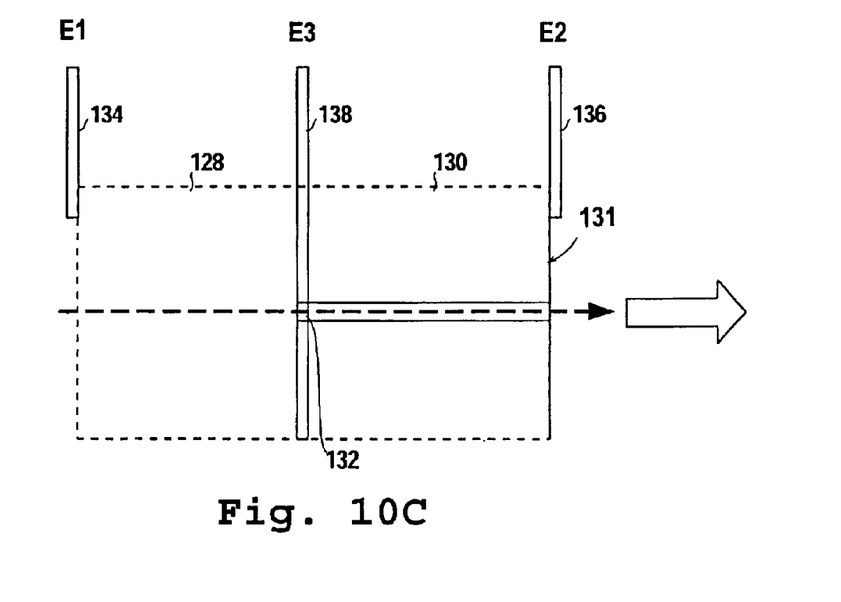
FIG. 10C shows key elements in a nanopore device constructed in accordance with the invention for determining DNA fragment lengths.

The construction of an electronic device 131 for measuring fragment length, based on the above principles, is shown FIG. 10C. In this case, a silicon micromachined, 1D nanosized pore is created as discussed above, at the intersection of two channel-forming substrates 128, 130. The size of this pore, shown at 132, is $S_p \times S_p$, measuring 2 nm×2 nm. The pore's channel length, $L_p$, is selectable within a range of 5 to 50 nm.

Electrodes 134 (E1), 136 (E2) located in buffer solutions can be placed on both sides of the nanopore membranes or attached to the surfaces of the silicon membrane at a point near the pore location, as shown in the figure. When the device includes an array of such pores, an array of surface-attached electrodes can used to monitor the ion current passing through more than one pore. Surface metalization of silicon doping methods, common to the microelectronic industry, can be used to form single electrodes or electrode arrays on the surface of the silicon. That is, multiple pores can be created and each pore can be monitored by a separate set of E1 and E2 electrodes. Another option to multiple-pore monitoring is to have a common E1 electrode and an array of E2 electrodes. Using multiple pores will allow for a more rapid data acquisition rate and a more extensive analysis.

Another advantage to a microfabricated nano-pore membrane channel is that a third electrode 138 (E3) can be added to the channel architecture, providing the advantage of using a fixed voltage of common E1 and E2 electrodes for pumping through the channel, while monitoring ion current using an array of E3 electrodes. The E3 electrode must be on the order of 5 nm thickness, and may be created by doping the silicon itself to increase its conductivity using methods common in the microelectronic industry.

G. DNA Sequence Analysis

Figure 11:
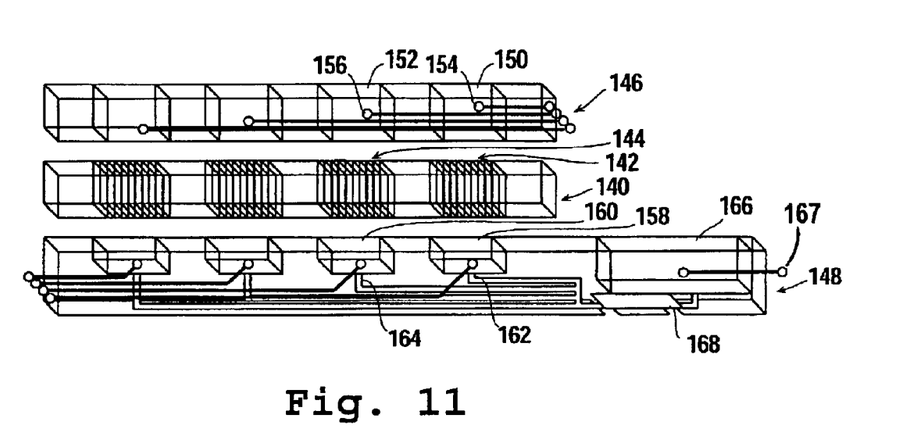
FIG. 11 illustrates elements of a DNA sequence detecting device constructed in accordance with the invention.

A basic design of a nanopump array intended for DNA sequence analysis, in accordance with another aspect of the invention, is given in FIG. 11. The central element 140 includes a series of nanopump channel arrays, such as arrays 142, 144, micromachined out of a single silicon wafer.

The nanopump array layer is sandwiched between upper and lower microfabricated layers 146, 148, respectively, upper layer 146 is fitted with discrete "donor" reservoirs, such as reservoirs 150, 152, which align above and are continuous with one side of the individual nanopumps. Each of the upper donor reservoirs is fitted with an electrode, such as electrodes 154, 156 in reservoirs 150, 152, respectively. A similar reservoir layer 148 is aligned below the nanopump layer, but in the case of this lower layer, the individual receiving reservoirs, such as reservoirs 158, 160, are also connected via channels, such as channel 162, 164, to a "common" receiving reservoir 166.

An optical flow-cell 168 is included in the channel leading to the receiving reservoir and a fluorescence optical detection system is positioned to measure the fluorescence signal of the fluid flowing through this common channel. Each of the three layers is aligned and sealed so that each nanopump is continuous with the corresponding donor and receiving reservoirs. The reservoirs and connecting channels are filed (primed) with electrolyte solution prior to use.

After fabrication and assembly, the surfaces of the channels are chemically grafted with reactive chemical groups (such as primary amino or thiol groups) using standard silane reagents. Alternatively the channels may be linked with a ligand such as avidin (or its binding partner/receptor, biotin). Capture DNA sequences are subsequently grafted to the surface directly or through avidin/biotin interactions. For attachment, the capture sequences are added to the common receiving reservoir and a voltage difference is applied between the common reservoir (anode) 167 and any or all of the individual donor reservoirs (cathodes). The DNA sequences migrate under the influence of the electric field from the common reservoir through the chemically modified (or ligand modified) nanopump channels, into the donor reservoirs. The polarity may be periodically reversed (cycled) to optimize the chemical grafting of the capture DNA to the nanopump channel surfaces as they pass. After capture DNA sequence grafting, the reservoirs and channels are washed by passage of buffer throughout the system.

Samples of fluorescent-labeled DNA probes of known sequence are added to the individual donor (upper) reservoirs. Current is passed through all the nanopumps in the array (anode in donor reservoirs, cathode in receiving reservoirs). As the probe DNA sequences pass through the nanopump channels, hybridization occurs. Again, cycling of the electrode polarity between the donor and receiving reservoir, and thus reversing the electrophoretic movement of the DNA probes, may be used as a strategy to promote optimal hybridization to capture DNA sequences bound to the nanopump channel surfaces.

Dehybridization of probe and capture DNA sequences is controlled by a combination of applied current (electrophoretic force, EF) and electroosmotic flow (tangential fluid flow force, TFFF). Importantly, these two forces may be in the same or opposite directions and may be applied as a gradient or pulsed. For example in the case of negatively charged DNA molecules (DNA is highly negatively charged by virtue of charged phosphate groups in each residue of the backbone structure), EF will always be in the direction of the cathode. Electroosmotic flow, and hence the TFFF, may be either cathodal or anodal, depending on the net surface potential at the plane of fixed charges on the nanopore surfaces. By adjusting and fine tuning EF and TFFF, the selectivity of denaturation of hybridized DNA will be improved, thus allowing for the discrimination of dehybridization of probe and capture DNA with fewer mismatched base pairs. SNP may be detected in this fashion with greater precision relative to EF alone. In the nanopump array configuration illustrated in FIG. 11, dehybridization would be expected to occur as the circuit is closed between the individual donor reservoirs and the common receiving reservoir. Electronic circuitry would be designed so that a spectrum of voltages, voltage pulses or perhaps cycles of polarity reversals, would be applied in sequence between individual donor reservoirs and the common receiving reservoir. When dehybridization occurs, the passage of the fluorescent-labeled probe DNA is detected by the optical system. Probe sequence identity is assured by energizing one donor reservoir at a time. Conditions under which the probe and capture DNA sequences dehybridize (voltage, and perhaps temperature and ionic strength) would be recorded, correlated with the probe sequence identity and related to the degree of mismatches base pairs. The flow-through configuration inherent in the nanopump design may also permit temperature adjustments and ionic gradients to control de-hybridization.

The combined effect of electrophoretic force and electroosmotic fluid flow provided by the nanopump design may improves the resolution of detachment of target probe DNA sequences from capture sequences (FIG. 12). Such a system may resolve either detachment (dehybridization) of probes containing mismatched base pairs (i.e., base-pair mismatch analysis) and/or different DNA chain lengths with same degree of hybridization.

The flow through feature of the nanopump array also obviates the need for reversing polarity to drive away non-specific analytes or nonreacted molecules. Buffer is simply flowed across bound probe layer to wash.

The flow through feature also permits changing the temperature and ionic strength of the running buffer up-stream of the nanopump array. This approach may permit the use of temperature gradients (in range of melting temperature, $T_m$ of duplex DNA) and/or ionic gradients in addition to electrophoretic forces and electroosmotic flow to refine dehydridization conditions and thus improve resolution of mismatched base pairs.

Although the invention has been described with respect to particular embodiments and examples, it will be appreciated that a variety of modifications and changes may be made without departing from the claimed invention.

What is claimed is:

1. A self-contained delivery device for delivery a selected volume of stored electrolyte solution at selected time intervals, comprising a housing having a delivery port, contained within said housing, a chamber containing an upstream supply reservoir for holding a quantity of electrolyte solution, a downstream delivery reservoir for receiving electrolyte solution from the supply reservoir and, disposed between the two reservoirs, a membrane having a plurality of flow-through channels extending between the two reservoirs, where said channels has a minimum cross-sectional dimension between 2 and 100 nm and a net surface charge at the pH of the electrolyte solution, a pair of electrodes placed in said chamber on either side of said membrane, a one-way valve connecting the delivery reservoir to the delivery port within said housing, allowing solution to flow out of the delivery port only, and a controller contained within said housing, including (i) a power source operatively connected to said electrodes for applying across the electrodes, a voltage potential effective to pump electrolyte solution from the supply to delivery reservoir, at a selecting pumping rate, and (ii) a timer for controlling the duration and timing of application of the voltage potential to the electrodes, to pump a selected volume of solution through said membrane, at selected time intervals.

2. The device of claim 1, wherein said housing is adapted for implantation at a body site, and said solution contains a therapeutic drug for delivery at said site.

3. The device of claim 1, wherein said voltage potential is less than 5 volts.

4. The device of claim 1, wherein said channels have a substantially uniform minimum dimension along their lengths.

5. The device of claim 4, wherein said channels have a minimum dimension in a selected range between about 2 and 30 nm.

6. The device of claim 4, wherein said timer is designed to apply across said electrodes, a pulsed voltage whose duration is effective to pump a selected volume of supply solution across said membrane.

7. The device of claim 1, wherein said membrane is formed of a material selected from the group consisting of silicon, polysilicon, polymers, and titanium.

* * * * *